(12) United States Patent
Lewis et al.

(10) Patent No.: US 9,274,678 B2
(45) Date of Patent: Mar. 1, 2016

(54) IDENTIFYING A THUMBNAIL IMAGE TO REPRESENT A VIDEO

(75) Inventors: Justin Lewis, Marina Del Rey, CA (US); Henry Benjamin, Sherman Oaks, CA (US); Stanley Charles Ross Wolf, Paris (FR)

(73) Assignee: Google Inc., Mountain View, CA (US)

( * ) Notice: Subject to any disclaimer, the term of this patent is extended or adjusted under 35 U.S.C. 154(b) by 585 days.

(21) Appl. No.: 13/614,229

(22) Filed: Sep. 13, 2012

(65) Prior Publication Data

US 2014/0074759 A1   Mar. 13, 2014

(51) Int. Cl.
*G06F 15/18* (2006.01)
*G06F 17/30* (2006.01)
*G06F 3/0484* (2013.01)
*G06F 3/0481* (2013.01)

(52) U.S. Cl.
CPC ........ *G06F 3/04817* (2013.01); *G06F 3/04842* (2013.01); *G06F 17/30843* (2013.01); *G06F 17/30849* (2013.01)

(58) Field of Classification Search
None
See application file for complete search history.

(56) References Cited

U.S. PATENT DOCUMENTS

| | | | | |
|---|---|---|---|---|
| 2007/0204238 | A1* | 8/2007 | Hua et al. | 715/838 |
| 2008/0046406 | A1* | 2/2008 | Seide et al. | 707/3 |
| 2009/0164419 | A1* | 6/2009 | Taylor et al. | 707/3 |
| 2009/0219300 | A1* | 9/2009 | Peleg et al. | 345/630 |
| 2010/0017389 | A1 | 1/2010 | Ogunbona et al. | |
| 2010/0070498 | A1* | 3/2010 | Zhang et al. | 707/736 |
| 2010/0070523 | A1 | 3/2010 | Kelgo et al. | |
| 2010/0092037 | A1* | 4/2010 | Peleg et al. | 382/103 |
| 2012/0106925 | A1* | 5/2012 | Dirik et al. | 386/240 |
| 2013/0080895 | A1* | 3/2013 | Rossman et al. | 715/720 |

FOREIGN PATENT DOCUMENTS

| | | |
|---|---|---|
| JP | 2007272701 | 10/2007 |
| JP | 2010226547 | 10/2010 |
| KR | 1020110011317 | 2/2011 |

OTHER PUBLICATIONS

International Search Report for PCT/US2013/059602, mailed Dec. 23, 2013.
Written Opinion for PCT/US2013/059602, mailed Dec. 23, 2013.

* cited by examiner

*Primary Examiner* — Jeffrey A Gaffin
*Assistant Examiner* — Mikayla Chubb
(74) *Attorney, Agent, or Firm* — Lowenstein Sandler LLP

(57) ABSTRACT

Techniques are shown for generating image frames from a media presentation, selecting candidate thumbnails from the generated image frames using a selection process, and testing each selected candidate thumbnail for a success ranking relative to a target metric. The probability of choosing a selected candidate thumbnail with a success ranking higher than all other selected thumbnails as an optimum thumbnail for presentation to a user is based, at least in part, on the ratio of the success ranking of the selected candidate thumbnail with the highest success ranking to the sum of the success rankings of all of the selected candidate thumbnails. This Abstract is submitted with the understanding that it will not be used to interpret or limit the scope or meaning of the claims.

28 Claims, 5 Drawing Sheets

IDENTIFYING A THUMBNAIL IMAGE TO REPRESENT A VIDEO

BACKGROUND

Video-sharing websites may only show a middle frame or some other randomly selected frame for a given video as an allegedly "representative" frame of the video. Such a random selection and presentation of a thumbnail image may be the determining factor in whether a user watches the video, and the level of satisfaction or achievement of other goals obtained from the user experience.

SUMMARY

Disclosed techniques provide a representative thumbnail image frame for a media presentation, e.g., a video or other grouping of still or streaming images presented on a video sharing web site. A thumbnail image selection system includes an image-frame generating utility that generates a set of one or more image frames from a media presentation. A thumbnail-selection utility selects one or more candidate thumbnail images from the set of image frames. A candidate-thumbnail-ranking calculator tests and ranks each selected candidate thumbnail relative to a target metric. A probabilistic-learning utility determines the probability of selecting a candidate thumbnail as an optimum candidate thumbnail as a function of the ratio between the success ranking of the selected candidate thumbnail and a sum of the success rankings of all of the thumbnail images selected by the thumbnail-selection utility. Finally, a presenter displays the optimum candidate thumbnail to the user.

Implementations may include corresponding systems, apparatus, and computer programs, configured to perform the actions of the methods, and encoded on computer storage devices. This Summary is not intended to introduce key features or essential features of the claimed subject matter, but merely provides a selection of concepts that are further described in the Detailed Description. Further implementations, features, and advantages, as well as the structure and operation of the various implementations are described in detail below with reference to accompanying drawings.

BRIEF DESCRIPTION OF THE FIGURES

Implementations are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
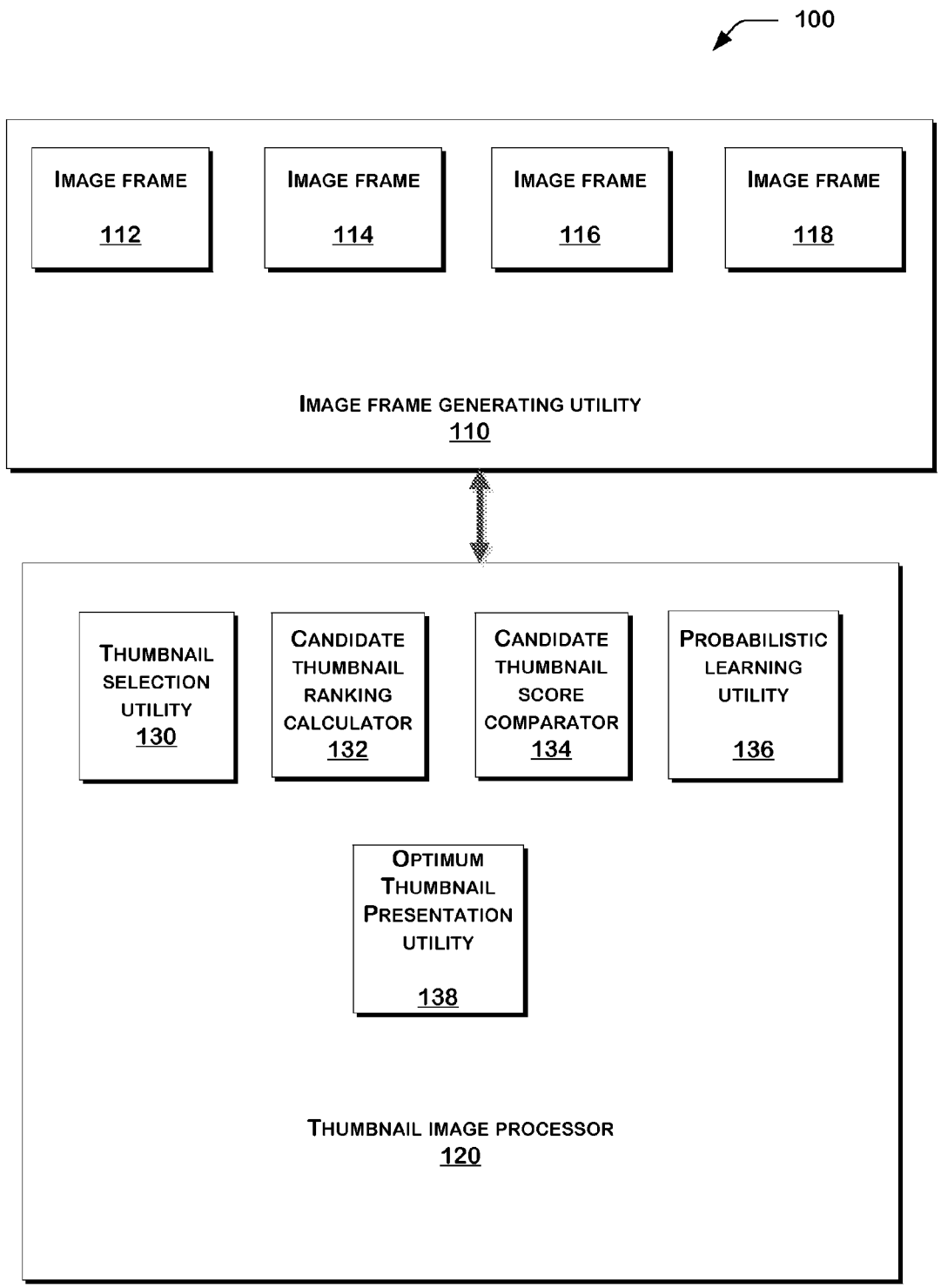
FIG. 1 is a block diagram illustrating components in accordance with one implementation of the disclosure.

Disclosed mechanisms identify optimum thumbnail images to represent videos presented on a video-sharing website, or optimum thumbnail images to represent any grouping or set of still or streaming images. An optimum thumbnail image is the image that results in the best success ranking relative to a target metric, where success is measured in terms of how useful the thumbnail image is in representing a media presentation and achieving goals of the user or media disseminator.

Disclosed techniques identify an optimum thumbnail image to represent a media presentation, e.g., a video presented on a video-sharing web site, or some other grouping or set of still or streaming images, icons, text objects, etc. A determination that a particular thumbnail is the "optimum" thumbnail for representing a particular media presentation includes a comparison of a score for the optimum thumbnail relative to a target metric as compared to the scores of other candidate thumbnails. A probabilistic learning utility uses a form of simulated annealing to determine an optimum thumbnail for a given media presentation, for a particular user, for a particular method of generating a thumbnail (source for the thumbnail), or for the results of a particular search term, web page, web channel, or topic of search results. The computational methods employed by the learning process are characterized by iteratively trying to improve a solution by replacing the solution with a random solution and measuring the progress relative to a target metric. Random, as used herein, includes pseudorandom, which may not be 100% random, 100% of the time.

As some illustrative results achieved by implementations of this disclosure, a selected optimum candidate thumbnail image from a video or other grouping of still or streaming images, when measured in comparison to other candidate thumbnails, yields higher click-through rates (CTR), or helps a user better identify the video, thereby yielding a higher Watch completion over CTR. A potentially selected representative thumbnail image may also be tied directly to desired parameters, e.g., revenue generated by the video, and the disclosed techniques may be used to select candidate thumbnail images that yield the most revenue. Certain thumbnail images may be found to attract a demographic of users more suitable for showing more profitable ads. Similarly, a method for generating a thumbnail for a particular user may be the optimum thumbnail source for that particular user. The rankings for the thumbnails generated using that optimum source for that user are greater than the rankings of other thumbnails generated using different sources for that user. As one example, thumbnail images with faces of celebrities may achieve better results relative to a metric such as CTR for one particular user, while thumbnail images with scenery shots may achieve better results relative to the same metric for a different user.

Digital technologies have had a significant effect on the dissemination and playback of media programs. First, digital technology permitted the use of digital video recorders (DVRs). DVRs provide a number of useful functions including live pause, the ability to record one program while playing back another, and the integration of the electronic program guides with DVR functionality (so that the recordation of media programs could be scheduled far in advance). Second, technology also permitted the dissemination and playback of media programs via the Internet, including through video sharing web sites. With improved signal processing and more and more households with high-speed Internet access (e.g. cable, DSL, fiber, satellite), this method of dissemination and playback has become common.

Dissemination of media programs via the Internet may occur either by simple downloading, progressive downloading or streaming. For progressive download, a media file having the media program is downloaded via the Internet using dial-up, DSL (Digital Subscriber Line), ADSL (Asymmetric Digital Subscriber Line), cable, or other high speed internet connections. Simple downloading downloads the bytes of the media file in any convenient order, while progressive download downloads bytes at the beginning of a file and continues downloading the file sequentially until the last byte. At any particular time during progressive downloading, portions of the file are not immediately available for playback. In some situations, the entire file must be downloaded first before a media player can start playback. In other situations, media players are able to start playback once enough of the beginning of the file has downloaded, however, the media player must download enough information to support some form of playback before playback can occur. Playback is often delayed by slow Internet connections and may be choppy and with a likelihood of stopping after only a few seconds. Downloaded material may also be stored on the end-user computer.

Streaming delivers media content continuously to a media player and media playback occurs simultaneously. The end-user is capable of playing the media immediately upon delivery by the content provider. Traditional streaming techniques originated from a single provider, such as the owner of a video sharing web site, delivering a stream of data to a set of end-users. High bandwidths and CPU power are required to deliver a single stream to a large audience, and the required bandwidth of the provider increases as the number of end-users increases.

Unlike progressive downloading, streaming media is delivered on demand or live. Where progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, media is delivered from dedicated servers having high bandwidth capabilities.

On-demand streaming media services, such as provided by a video sharing web site, movie delivery web site, etc., allow a broad spectrum of media programs to be made available to the user for immediate viewing. One of the challenges in providing on-demand streaming media services is to provide the user with an interface that allows the user to efficiently and effectively select which media program they would like to view.

One way to provide the user with information about available media programs is to use metadata, or summary data. Such metadata may include factors such as the source of the media program, actors, genre (drama, comedy), target age group, and/or one or more thumbnails (small still video frames of the media program) of the media program. The metadata can then be used to assist the user in searching for the media program of interest or to assist the media program disseminator to organize the media programs in a way that conveniently allows the user to find the media program of interest.

Visual metadata (such as the thumbnails) can be used to illustrate or represent the media program in a user guide or other presentation on a client device. Obtaining such thumbnails is a relatively simple matter if the choice of the thumbnail is not critical or if the party providing the media program also provides the thumbnail. However, in media dissemination paradigms where there are a large number of media programs provided, the media program providers may not provide the thumbnail and the thumbnail selection is critical, generating thumbnails is not a simple matter. For example, a randomly selected frame of the video may provide little or no information about the media program, or such a random frame may misrepresent the content of the program. A user clicking on such a randomly selected frame may be disappointed with the resulting video or presentation of still or streaming images. The effect may be a poor user experience, as well as less than optimum results for the provider of the video or other media presentation. The randomly selected thumbnail may also include an image that fails to appeal to the type of user the disseminator of the video had hoped to reach.

Even if the user is provided a number of potential thumbnails, evenly distributed temporally through the media program, these thumbnails may not adequately represent the underlying media program. Further, while it is possible to allow the user to scan through the media program frame by frame to identify a suitable thumbnail, this is a time-consuming process when the entity identifying the thumbnail is a media disseminator that must deal with hundreds or thousands of media programs. What is needed is a method and apparatus that permits an optimum thumbnail to be quickly and easily identified, where the selected thumbnail provides a useful representation of the media program, from the perspective of a desired target metric.

Video data or other image data can be scanned to identify image frame and potential candidate thumbnails. A candidate thumbnail can then be selected from the image frames or potential candidate thumbnails using any of a number of different methods of selection. A selected candidate thumbnail is then given a score by measuring results obtained relative to a particular metric as a function of the selection. Because of the potentially huge number of candidate thumbnails that would have to be evaluated and scored to arrive at an optimum thumbnail for a particular video with regard to a particular metric, a metaheuristic learning process can be applied to the problem solution. Metaheuristics is a high level strategy for exploring a search space using different methods.

Simulated Annealing (SA) is a metaheuristic learning process that provides an explicit strategy to avoid a solution that converges on a local, apparently optimum value, rather than the desired global optimum value. The SA learning process, as applied to finding the solution of an optimum thumbnail, allows successive random moves from one potential candidate thumbnail to another, possibly resulting in solutions of worse quality (thumbnail with a worse score relative to a metric), thereby escaping from a convergence on a false local optimum value. The ability to jump to a random value that is farther away and/or in a different direction than a previous tested value, especially early on in the solution process, avoids a convergence on a false local optimum value.

The SA learning process allows for a determination of an acceptably good solution in a fixed amount of time, rather than the best possible solution in an infinite amount of time. Each step of the SA learning process attempts to replace the current solution with a random solution (chosen according to a candidate distribution, often constructed to sample from solutions near the current solution). The new solution may then be accepted with a probability that depends both on the ratio between the score of the currently selected solution and the aggregate scores for all previous solutions, and also on a global parameter, that may be gradually changed during the process. The dependency is such that the choice between the previous and current solution is almost random when the global parameter is less than one, but increasingly selects the better solution as the global parameter increases from one. The allowance for moves that seemingly take the solution farther away from the optimum value when the global parameter is less than one potentially saves the method from becoming stuck at a local minimum rather than approaching the desired global optimum solution. The SA learning process as applied to finding a solution for an optimum candidate thumbnail in one implementation is expressed with the following Equation A:

Equation A: $(CT^{exponent})/Sum(Si^{exponent}$ for all Si in S), where $CT^{exponent}$ is the highest scoring candidate thumbnail's score raised to an exponent, where the exponent is the global parameter referred to above. $Si^{exponent}$ is the thumbnail score raised to the exponent for each member of the set S of thumbnails that are selected and scored. The probability of showing a given candidate thumbnail CT from the set S of candidate thumbnails is calculated by Equation A.

The mapping between a candidate thumbnail's score CT relative to a particular metric and the probability of selecting that candidate thumbnail to present to a user from a set of thumbnails may not be linear. In one possible implementation of this disclosure, as illustrated by a learning process applying the above Equation A, the scores of a candidate thumbnail may have some exponent (global parameter) applied to them before calculating the probability of selecting and presenting a particular thumbnail.

Exponents>1 will give higher precedence to thumbnails which have high success rates, or high scores relative to a target metric, and lower precedence to unproven thumbnails, or thumbnails with lower success rates or lower scores relative to the target metric. Exponents<1 will give higher precedence to unproven thumbnails. Exponents<1 may be used early on in the iterative process of selecting candidate thumbnails in order to avoid converging on an apparently optimum candidate too soon before enough data has been gathered. Even with exponents<1, the most successful thumbnails will still appear more frequently than less successful thumbnails, but the gap between the number of appearances for the most successful thumbnail and the less successful thumbnails will be much smaller. In some implementations, the exponent that is used may be unique to each video, with all candidate thumbnails for a particular video using the same exponent. The exponent may also be dynamic. For example, the exponent might be varied relative to the number of views for a particular video or other grouping of still or streaming images. In this implementation, videos with more views would have a higher exponent, and therefore the above formula would yield a more consistent showing of a particular thumbnail. On the other hand, new videos that have fewer views will tend to have a lower exponent, and therefore more lower scoring, unproven, or experimental thumbnails.

The above-referenced formula as applied in selecting a candidate thumbnail provides a method for performing a global optimization of the selection process. The formula is applied in a computational method that optimizes the problem of which candidate thumbnail to select by iteratively trying to improve the end result. If the results keep improving as each successive candidate thumbnail is selected the same distance away and/or in the same direction away from the previous selection, the iterative selection of thumbnails can continue with each selection being the same distance away and/or in the same direction. But if the results stop improving, the learning process can randomly select the next candidate at a farther away distance and/or in a different direction.

Each step of the simulated annealing process characterized by the above-discussed formula is relatively simple, but the formula may also include a variety of other factors. For example, new candidate thumbnails may start with a given initial score. Perhaps this initial score is relative to the average score of the already existing candidate thumbnails. Similarly candidate thumbnail scores do not need to start at 0.

Target Metrics for Scoring Candidate Thumbnail

The target metrics used in determining a score for a particular selection of a candidate thumbnail may include:

Click Through Rate (CTR), which is the number of clicks on the selected thumbnail divided by the number of times the thumbnail is shown, expressed as a percentage;

Watch Completes, which is the number of times the video or other grouping of still or streaming images is watched through to completion after a user has viewed the selected thumbnail representative of the video or other grouping of still or streaming images;

Short Watches, which is the number of times the video is only watched for a short period of time or not through to completion after a user has viewed the selected thumbnail;

Revenue generated, which is the amount of revenue generated from a video or other grouping of images viewed after seeing a particular selected thumbnail, e.g., from links to ads or other revenue-generating mechanisms provided in the video or other grouping of still or streaming images;

Watch count per session rate, such as the number of times a video is watched during a particular period of time or during a particular online session, etc.

One part of the techniques applied according to one example implementation of this disclosure is to generate a set S of N thumbnail images from video data or other media data to be presented as streaming or still image frames. At any point in this process more thumbnails can be added to the set or removed from the set of thumbnails. This set of thumbnails can be generated in many different ways. The set S of thumbnails may be generated for a particular media presentation, such as video presented on a video sharing web site, irrespective of any search terms or users, for the media presentations that are discovered in a search using a certain search term or group of terms or phrases, for a certain location such as a web search page, channel web page or other homogenous grouping of still or streaming images or other media, for a particular user, or for a particular method of generating or source of the thumbnails—such as in accordance with a particular user's behavioral preferences, etc.

Example Methods for Selecting Candidate Thumbnails from Image Frames

Some non-limiting examples of methods for selecting potential candidate thumbnails from a plurality of image frames can include the following:

Temporal frame selection—where the selection is of every Nth frame or every frame that is x % of the total number of image frames;

Random frame selection;

Frames that are viewed the most by a particular user, or a broad base of users;

Frames that provide faces, or the clearest view of faces; Frames with pictures of a particular actor, sport's figure, or other celebrity;

Frames that provide the highest contrast in colors or shading; Frames that provide the brightest, or the most subdued hues, colors, etc.;

Frames that have the lowest, or the highest delta or difference from surrounding frames;

Frames with particular attributes or characteristics specific to a desired category or subject matter;
Frames that are displayed the most prominently on a web page;
Frames with the most action depicted, or extreme action;
Frames with architectural structures;
Frames with animals;
Frames with babies;
Frames with scenery; etc.

In alternative implementations, employed humans or users could suggest candidate thumbnail frames. Video sharing web sites may let a user pick which frame to show as a representative thumbnail when they share a video on a social network. In one implementation, a thumbnail-selection utility searches various communication networks, such as the Internet, to find the image frames which a particular user or group of users picked most frequently as representative of a video, and the thumbnail-selection utility uses those picks as potential candidate thumbnail images. Similarly, many blogs review videos and TV episodes. Frequently they will have their own screen shots of the video. The thumbnail-selection utility can be operatively configured to comb the Internet or other communication networks to find these screen shots, and use the ones that are put in the most prominent positions on the web page. News articles will frequently have other images to accompany a video. Instead of picking an image frame from the video itself, these other frames or screen shots selected by blogs, news organizations, or other third parties could be used in the selection process to arrive at an optimum candidate thumbnail image.

Each selected candidate thumbnail may be associated with a score. This score reflects the up-to-date success of that thumbnail with respect to one or more metrics. A thumbnail to display as representative of a media presentation, e.g., a video or collection of still or moving images, icons, objects, or still or streaming media of any type, may be randomly selected from a list or set of thumbnails such that the probability of selecting any particular thumbnail is proportionate to the score of that thumbnail relative to the aggregate score for the set of thumbnails. In this way thumbnails with a higher score are chosen more frequently, but on occasion other thumbnails are picked and tested. The score increases proportional to the increase in the target metric. For example, if the testing metric is click through rates (CTR), the score for a given thumbnail increases each time the candidate thumbnail is used or clicked on by a user.

Example Implementation

Referring initially to FIG. 1, a thumbnail image selection system 100 includes an image-frame generating utility 110 and a thumbnail image processor 120. Although the image-frame generating utility 110 is shown diagrammatically as a separate block, or module from the thumbnail image processor 120, the various components could be combined together onto one server, or a group of servers, or some combination of a server or servers and a client or multiple clients communicatively coupled together over a network.

Image-frame generating utility 110 generates a set of image frames 112, 114, 116, 118 from a media presentation on a video-sharing web site or other location or source for a grouping of still or streaming images, icons, objects, or other media.

Thumbnail image processor 120 includes a thumbnail-selection utility 130, a candidate-thumbnail-ranking calculator 132, candidate thumbnail score comparator 134, a probabilistic-learning utility 136, and an optimum thumbnail presentation utility 138.

The thumbnail-selection utility 130 employs one or more of the above-listed methods for selecting candidate thumbnails from the image frames generated by image-frame generating utility 110. For example, the thumbnail-selection utility may use a non-random, temporal method of selection, and select every Nth frame of the generated image frames, or every frame that is N % of the total number of generated image frames, as a candidate thumbnail image to be tested. Alternatively, the thumbnail-selection utility may use a completely random method of selection of image frames.

Candidate-thumbnail-ranking calculator 132 tests each selected thumbnail for a success ranking relative to one or more of the above-discussed target metrics, e.g., CTR, Watch completions, revenue generated by the media presentation represented by the candidate thumbnail, etc. The appropriate target metric can be selected from memory or a selection made by a user or a developer. In addition to calculating the success ranking for each new selected candidate thumbnail, the aggregate sum of the success rankings for all selected candidate thumbnails is also calculated.

Candidate thumbnail score comparator 134 aggregates all of the success rankings for all of the selected thumbnails, and determines the ratio between the success ranking for the highest ranking thumbnail and the success rankings for all of the selected thumbnails.

Probabilistic-learning utility 136 applies an iterative solution to the problem of finding the most representative thumbnail in accordance with a computational analysis such as represented by Equation A above. As each candidate thumbnail is selected, the candidate-thumbnail-ranking calculator 132 determines the associated success ranking for that thumbnail, the candidate thumbnail score comparator 134 aggregates all of the thumbnail success rankings, and the probabilistic-learning utility 136 controls the selection of additional candidate thumbnails in order to attempt to converge on an optimum solution. The optimum thumbnail presentation utility 138 provides data for displaying the determined optimum thumbnail to a user through a user interface on a client device or other display or presentation mechanisms. The optimum thumbnail presentation utility is shown as being part of the thumbnail image processor 120, but can be provided as part of one or more servers, as part of the client, or as a combination of both.

The success rankings for each selected candidate thumbnail can each be raised to an exponent, such as shown in Equation A, and the exponent can be varied from a value less than one to a value greater than one. Early on in the evaluation process, before enough data has been calculated, there is a chance of converging on a false optimum value that is only a local optimum, rather than the desired global optimum candidate thumbnail. This could happen as the success ranking of each successively selected thumbnail continues to improve, with each successive thumbnail being selected the same distance away, and/or in the same direction away from the previous thumbnail. The probability of selecting the highest ranking thumbnail as the optimum thumbnail could increase rapidly, and before enough data has been gathered to know if it is truly an optimum thumbnail for the entire media presentation, if the exponent is greater than one early on in the selection process. To avoid this convergence on a false, local optimum, the exponent can be kept less than one until a certain amount of data has been gathered, and the success rankings of a sufficiently representative selection of thumbnails have been gathered. The value that constitutes a sufficiently representative selection of thumbnails can vary depending on the type and/or size of media presentation, the resulting success rankings of selected thumbnails, the time taken during the selection process, and other variables.

Additionally, if successive, iterative selections of candidate thumbnails fail to continue improving the score or success rankings of the thumbnails, the probabilistic-learning utility can jump to a random thumbnail at a farther distance away, and/or in a different direction than was the case for the previous selection.

Example Implementation for a Media Presentation

Figure 2:
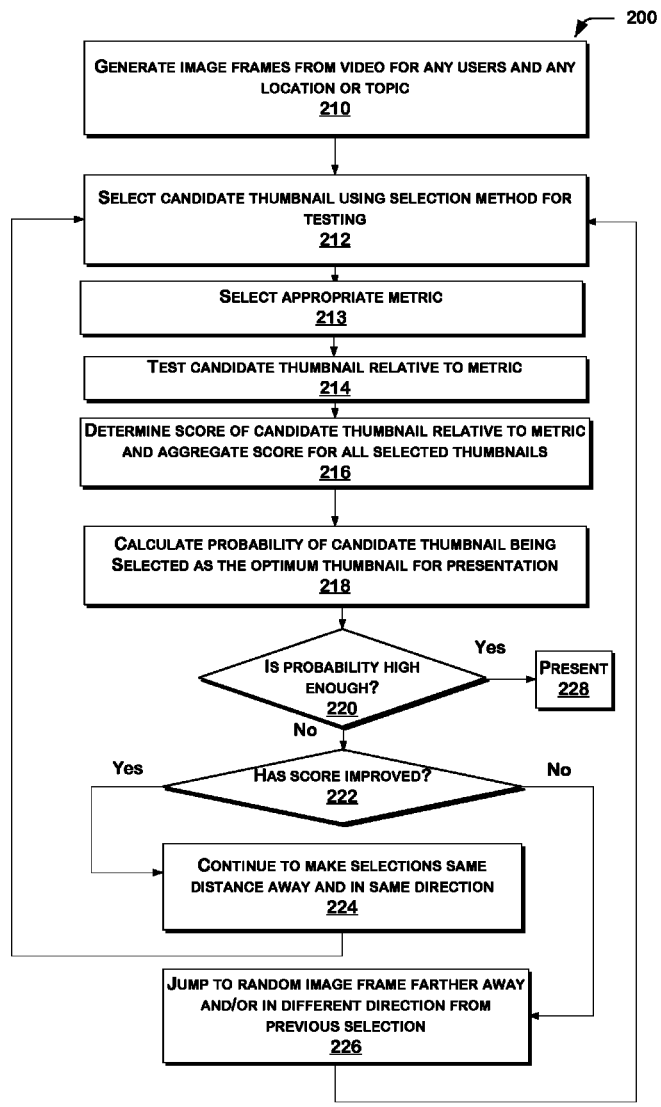
FIG. 2 is a flow chart illustrating techniques in accordance with an implementation of the disclosure.

Referring to FIG. 2, an example process 200 that implements techniques according to this disclosure is shown. The illustrated example implementation learns the optimum representative thumbnail for a media presentation, e.g., a video or other grouping of still or streaming images presented on a media sharing web site, for all users and locations of that media presentation. An optimum representative thumbnail image may be determined in conjunction with a comparison of the scores of each candidate thumbnail relative to one or more of the target metrics discussed above. In various alternative implementations, an optimum result could be considered to be the thumbnail image with the highest score for any one metric, the lowest score for any one metric, the highest cumulative score for more than one metric, the lowest cumulative score for more than one metric, etc.

At 210, an image-frame generating utility generates image frames from a media presentation, e.g., a video or other group of streaming or still images presented on a media sharing web site. The image frames can be generated by a processing element capable of processing video sequences from the media presentation, to automatically generate thumbnail image representations of those sequences. Each sequence of video from the media presentation can include a plurality of frames, each of which comprises an image of a scene that may include one or more objects. The image source, such as a media sharing web site, can be capable of providing one or more video sequences in a number of different formats including, for example, Third Generation Platform (3GP), AVI (Audio Video Interleave), Windows Media®, MPEG (Moving Pictures Expert Group), QuickTime®, RealVideo®, Shockwave® Flash®, or the like.

At 212, a thumbnail-selection utility selects a candidate thumbnail using any of the methods of selection of thumbnail candidates from a plurality of image frames, as listed above. Methods for selecting candidate thumbnails from the generated image frames can be based on factors that are not specific to any particular user and are applied across a broad user base for any one particular video, group of streaming or still images, or other media presentation.

At 213, an appropriate target metric can be selected by retrieving the metric from memory. The selection could also be made randomly by a user or developer. Other alternative methods for selecting the appropriate target metric could include basing the selection on an analysis of the desired goals of the media disseminator. For example, if the primary goal is to maximize revenue generated by the media presentation represented by the thumbnail, then the target metric selected may be revenue generated. If the primary goal is to just ensure that the user watches the entire media presentation, then the selected target metric may be watch completions. A selection of Click Through Rates (CTRs) as the target metric may follow from a desire to increase a particular ranking based on the CTR.

At 214, a candidate-thumbnail-ranking calculator determines the score or ranking for the latest selected candidate thumbnail relative to one or more of the target metrics discussed above. As one example, if a desired metric for ranking the thumbnails is the Click Through Rate (CTR), the candidate-thumbnail-ranking calculator may store the necessary processing techniques for determining the CTR. If the desired metric is the amount of revenue generated, then appropriate processing techniques for determining this data may be stored by the candidate-thumbnail-ranking calculator. For example, the candidate-thumbnail-ranking calculator may initially present the candidate thumbnail on a video sharing web site as representative of a video, and keep track of one or more of the Click Through Rate (CTR) for that candidate thumbnail, the Watch Completes for that candidate thumbnail, or the amount of revenue generated in conjunction with presentation of the video represented by the candidate thumbnail over a certain period of time after first presenting that candidate thumbnail, for all users and all display locations.

At 216, a candidate thumbnail score comparator determines the ratio between the highest ranking or scoring candidate thumbnail so far, as calculated by the candidate-thumbnail-ranking calculator, and the aggregate sum of the scores for all candidate thumbnails selected by the thumbnail-selection utility at 212.

At 218, a probabilistic-learning utility applies a learning process, such as represented by Equation A above, in order to calculate the probability of a candidate thumbnail being selected as the optimum thumbnail for presentation as representative of a video or other media presentation. As discussed above, a global parameter, represented as the exponent in Equation A, can be varied to facilitate closing in on a global optimum value as quickly as possible. The exponent can be varied from values that are less than one early on in the thumbnail selection process in order to avoid giving an initially high scoring candidate thumbnail too much weight before sufficient data has been gathered, to values greater than one as more data is gathered.

The effect of increasing the exponent in Equation A as applied by the probabilistic-learning utility can be illustrated by the following hypothetical example: Assume 10 candidate thumbnails have been selected by the candidate thumbnail-selection utility, and one of the ten has been determined by the candidate-thumbnail-ranking calculator to have a score of 10 relative to a target metric, while the other 9 candidate thumbnails each have scores of 1. If the exponent is one in Equation A, the high scoring thumbnail has a probability of selection that is only 10/19, or approximately a 1 in 2 chance. However, if the exponent is increased to 2, Equation A now yields a probability of 100/109, or approximately much closer to a 1 in 1 chance of being selected. The result is that for exponents greater than one, the probability of selecting a high scoring thumbnail as the optimum thumbnail increases in a non-linear fashion, and as shown at 220, when the probability is high enough, the selected high scoring thumbnail is considered the optimum thumbnail, and the iterative process ends with a presentation of the optimum thumbnail to a user at 228.

If the probability of selection of the highest ranking thumbnail is not high enough at 220, a check is done at 222 to determine whether the score of the latest selected thumbnail has improved. If the score has improved, then at 224, the candidate thumbnail-selection utility continues to make selections the same distance away and/or in the same direction. If the score has not improved, then at 226, the probabilistic-learning utility can decide to jump to a random image frame farther away and/or in a different direction from the previous selection. The process returns to 212 to select a candidate thumbnail using any of the methods of selection of thumbnail candidates from a plurality of image frames, as listed above.

Example Implementation for Particular Search Location or Topic

Figure 3:
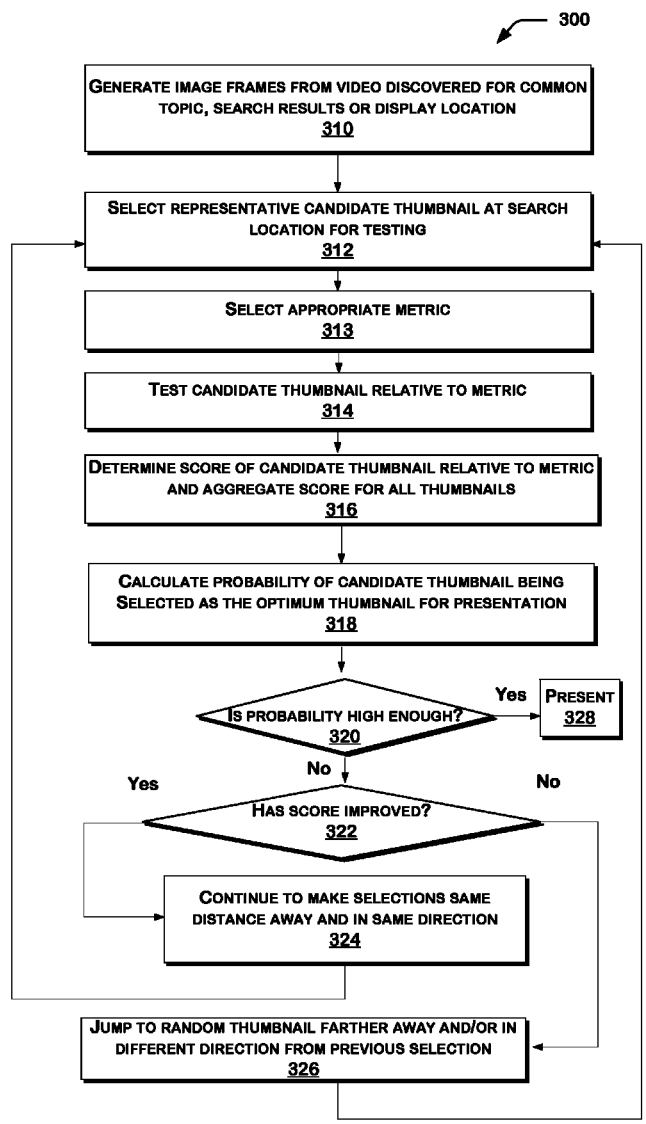
FIG. 3 is a flow chart illustrating techniques in accordance with another implementation of the disclosure.

Referring to FIG. 3, an example process 300 that employs techniques according to one implementation of this disclosure is shown. The illustrated example implementation learns the optimum representative thumbnail for media presentations, e.g., videos or other groupings of still or streaming images presented on a media sharing web site, for all users and for a particular search result or display location for those media presentations. An optimum representative thumbnail image may be determined in conjunction with a comparison of the scores of each candidate thumbnail relative to one or more of the target metrics discussed above. In various alternative implementations, an optimum result could be considered to be the thumbnail image with the highest score for any one metric, the lowest score for any one metric, the highest cumulative score for more than one metric, the lowest cumulative score for more than one metric, etc.

The methods for generating image frames and selecting an optimum candidate thumbnail according to this example implementation are based on the results of a search for a particular topic or search term, e.g., a collection of media presentations, videos or other groupings of still or streaming images located on a particular search results page, channel page, etc.

In this implementation, where a metaheuristic, such as the SA learning process discussed above, is applied to learn about the optimum thumbnail for a particular display location, topics page, or search results, multiple videos could have the same candidate thumbnail image. This is because for any particular topic or search term, there could be videos that refer to or include clips from other videos about the same topic. Each video can be provided with a score associated with each other video that appears on the same topic page, or on the same list and which shares an equal (or similar) thumbnail. This score will be called the "conflict score".

Media presentations such as videos or other groups of streaming or still images appearing on the same search page may share the same representative thumbnail since videos may include clips from other videos. In this particular implementation, duplicate thumbnails are especially relevant because a user will likely respond identically to the identical candidate thumbnails. To pick a single thumbnail to display, the thumbnail selection learning process may randomly select a candidate thumbnail from the generated image frames such that the probability of the candidate thumbnail being selected is relative to the ratio of the score of the candidate thumbnail to the aggregate score for the set of all selected thumbnails.

Early on in the thumbnail selection process, before sufficient data has been obtained for a meaningful score, an exponent less than one can be used in Equation A discussed above to avoid converging on a local optimum rather than the desired global optimum. As discussed above, an exponent less than one increases the probability of a lower scoring candidate thumbnail being selected as the representative thumbnail, and can prevent convergence on an optimum thumbnail before sufficient data has been gathered.

When selecting candidate thumbnails from image frames of videos resulting from a common search topic, for every set of videos for which the same thumbnail was picked, the thumbnail selection learning process retrieves the conflict scores for all these pairs of videos. If the conflict score does not yet exist, then instead the learning process can pick a starting score for the two thumbnails. Then the learning process calculates the scores per thumbnail, and separately sums the aggregate scores for the set of selected thumbnails. The ratio of the candidate thumbnail's score to the aggregate set score, as illustrated by Equation A above, represents the probability that the thumbnail will be picked as the optimum thumbnail. A next step may include recursively running the learning process on the remaining videos from the same location, or search results, to pick thumbnails for them, excluding already picked thumbnails.

There may be situations where the search results for a particular topic or search term turns up so many related videos or media presentations that the space is too large to expect the SA learning process to reasonably converge on an optimum value with the expected traffic patterns or the numbers of visits by users. The problem may be increased as a result of new videos uploaded to the space during the selection process. In this situation, an optional variation would be to determine an optimum thumbnail for just one video from the space or search location. As more users visit the location so that there is sufficient traffic for the learning process to converge on an optimum solution, the results can be used to interpolate between the model based on a single video to a model based on the entire search location.

The score or success ranking for a selected thumbnail increases proportional to the increase in the target metric. So when testing just click through rates (CTR), the score for a given thumbnail increases each time the candidate thumbnail is used and clicked. The scores for thumbnails can also be negatively weighted. For example, if the user does not watch the whole video, or hits the back button quickly after starting to watch a video, then this can be considered a negative weight for the thumbnail. In this case the score might decrease. This is dependent on the metrics used in training a selection learning process. Metrics used for negative scoring do not need to be the same as those for positive scoring. In various alternative implementations, a thumbnail-selection utility can adjust the conflict scores for two or more videos having the same or similar representative thumbnails based on the order in which the thumbnails where picked. For example, if the user clicks on video B in a set of videos (video A, video B, video C) the score AB decreases because B is picked after A, and the score for BC increases because B is picked before C.

At 310 in FIG. 3, an image-frame generating utility generates image frames from media presentations discovered from a common topic, search results, or display location, e.g., videos or other groups of streaming or still images presented on a search page, channel page, etc. The image frames can be generated by a processing element capable of processing video sequences from the media presentations, to automatically generate thumbnail image representations of those sequences. Each sequence of video from the media presentations can include a plurality of frames, each of which comprises an image of a scene that may include one or more objects. The image source, such as a media sharing web site, can be capable of providing one or more video sequences in a number of different formats including, for example, Third Generation Platform (3GP), AVI (Audio Video Interleave), Windows Media®, MPEG (Moving Pictures Expert Group), QuickTime®, RealVideo®, Shockwave® Flash®, or the like.

At 312, a thumbnail-selection utility selects a representative candidate thumbnail at the search location using any of the random or non-random methods of selection of thumbnail candidates from a plurality of image frames, as listed above. Methods for selecting candidate thumbnails from the generated image frames can be based on factors that are not specific to any particular user and are applied across a broad user base for the group of streaming or still images, or other media presentations discovered for the search topic or at a particular search location. In this example implementation, the selected candidate thumbnail is also appropriate for the topic or search results.

At 313, an appropriate target metric can be selected by retrieving the metric from memory. The selection could also be made randomly by a user or developer. Other alternative methods for selecting the appropriate target metric could include basing the selection on an analysis of the desired goals of the media disseminator. For example, if the primary goal is to maximize revenue generated by the media presentation represented by the thumbnail, then the target metric selected may be revenue generated. If the primary goal is to just ensure that the user watches the entire media presentation, then the selected target metric may be watch completions. A selection of Click Through Rates (CTRs) as the target metric may follow from a desire to increase a particular ranking based on the CTR.

At 314, a candidate-thumbnail-ranking calculator determines the score or ranking for the latest selected candidate thumbnail relative to one or more of the target metrics discussed above. For example, the candidate-thumbnail-ranking calculator may initially present the candidate thumbnail at the search location as representative of videos or other media presentations, and keep track of one or more of the Click Through Rate (CTR) for that candidate thumbnail, the Watch Completes for that candidate thumbnail, or the amount of revenue generated in conjunction with presentation of the videos represented by the candidate thumbnail over a certain period of time after first presenting that candidate thumbnail, for all users and at the particular display location or search results page.

At 316, a candidate thumbnail score comparator determines the ratio between the highest ranking or scoring candidate thumbnail so far, as calculated by the candidate-thumbnail-ranking calculator, and the aggregate sum of the scores for all candidate thumbnails selected by the thumbnail-selection utility at 312.

At 318, a probabilistic-learning utility applies a learning process, such as represented by Equation A above, in order to calculate the probability of a candidate thumbnail being selected as the optimum thumbnail for presentation as representative of videos or other media presentations at the particular display location or search results page. As discussed above, a global parameter, represented as the exponent in Equation A, can be varied to facilitate closing in on a global optimum value as quickly as possible. The exponent can be varied from values that are less than one early on in the thumbnail selection process in order to avoid giving an initially high scoring candidate thumbnail too much weight before sufficient data has been gathered, to values greater than one as more data is gathered. The result is that for exponents greater than one, the probability of selecting a high scoring thumbnail as the optimum thumbnail increases in a non-linear fashion, and as shown at 320, when the probability is high enough, the selected high scoring thumbnail is considered the optimum thumbnail, and the iterative process ends with presentation of the optimum thumbnail to a user at 328.

If the probability of selection of the highest ranking thumbnail is not high enough at 320, a check is done at 322 to determine whether the score of the latest selected thumbnail has improved. If the score has improved, then at 324, the candidate thumbnail-selection utility continues to make selections the same distance away and/or in the same direction. If the score has not improved, then at 326, the probabilistic-learning utility can decide to jump to a random image frame farther away and/or in a different direction from the previous selection. The process returns to 312 to select a candidate thumbnail at the particular search location using any of the random or non-random methods of selection of thumbnail candidates from a plurality of image frames, as listed above.

Example Implementation for Best Source for a Particular User

Figure 4:
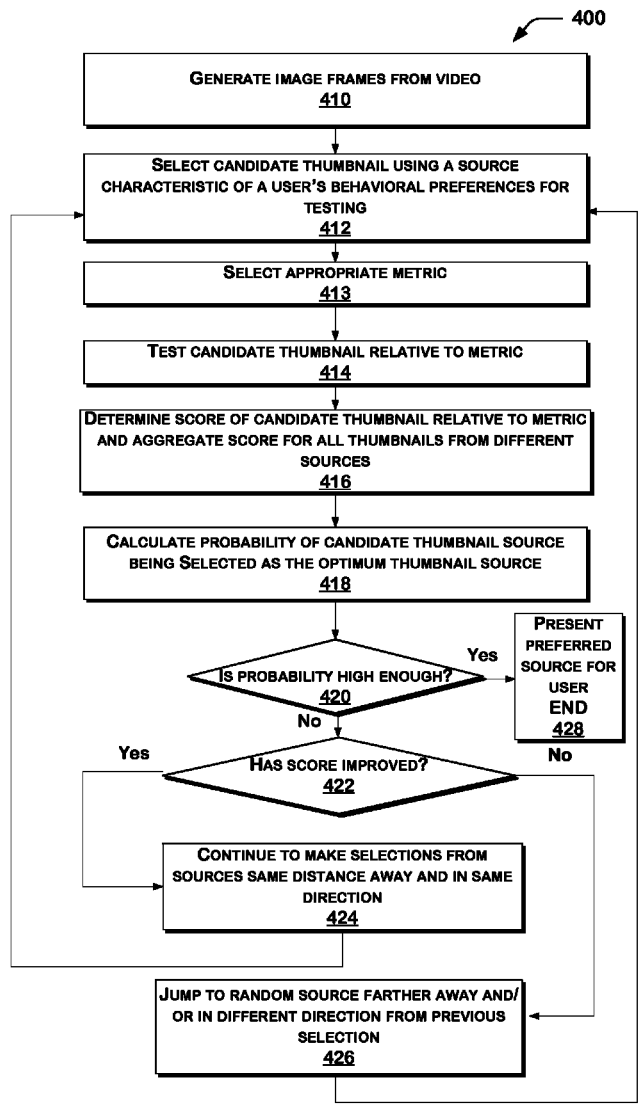
FIG. 4 is a flow chart illustrating techniques in accordance with yet another implementation of the disclosure.

Referring to FIG. 4, an example process 400 that implements techniques according to this disclosure is shown. The illustrated example implementation learns the optimum representative thumbnail for a media presentation, e.g., a video or other grouping of still or streaming images presented on a media sharing web site, for a particular user in accordance with that particular user's behavioral preferences. An optimum representative thumbnail image may be determined in conjunction with a comparison of the scores of each candidate thumbnail relative to one or more of the target metrics discussed above. In various alternative implementations, an optimum result could be considered to be the thumbnail image with the highest score for any one metric, the lowest score for any one metric, the highest cumulative score for more than one metric, the lowest cumulative score for more than one metric, etc. The methods for selecting an optimum candidate thumbnail can be tailored for that particular user and based on that user's behavioral preferences and what method of selecting or source of thumbnails works best for that particular user.

In the alternative implementation of FIG. 4, wherein the method for selecting a candidate thumbnail is tailored for a particular user and based on that user's behavioral preferences, each thumbnail source and user can be associated with a score. This score reflects the success of that thumbnail source for that particular user. Different users may have different behavioral preferences, and therefore different thumbnail sources may be the most effective at selecting an optimum candidate thumbnail for each user. For example, one user may typically click on thumbnails with pictures of faces. For that particular user, a thumbnail with a picture of a face may have a higher score or success ranking than a thumbnail that includes a scenery shot. Another user may gravitate toward thumbnail images with bright colors, pictures of animals, etc.

An application of the SA learning process discussed above to different thumbnail sources, or methods of generating a thumbnail image in accordance with a particular user's behavioral preferences, allows for a convergence on the optimum thumbnail source for that user, even when the user is not consciously aware of their own preferences. In this case, where an optimum source or method of generating a thumbnail is sought, thumbnails with sources that have higher scores are chosen more frequently. But on occasion, the random selection process results in the thumbnail-selection utility selecting other thumbnail sources or other thumbnails with lower scoring results.

The example process 400 implements techniques to learn the optimum source or method of generating a representative thumbnail for a particular user. An optimum representative thumbnail image may be determined in conjunction with a comparison of the scores of each candidate thumbnail relative to one or more of the target metrics discussed above. In various alternative implementations, an optimum result could be considered to be the thumbnail image with the highest score for any one metric, the lowest score for any one metric, the highest cumulative score for more than one metric, the lowest cumulative score for more than one metric, etc.

At 410, an image-frame generating utility generates image frames from a media presentation, e.g., a video or other group of streaming or still images presented on a media sharing web site. The image frames can be generated by a processing element capable of processing video sequences from the media presentation, to automatically generate thumbnail image representations of those sequences. Each sequence of video from the media presentation can include a plurality of frames, each of which comprises an image of a scene that may include one or more objects. The image source, such as a media sharing web site, can be capable of providing one or more video sequences in a number of different formats including, for example, Third Generation Platform (3GP), AVI (Audio Video Interleave), Windows Media®, MPEG (Moving Pictures Expert Group), QuickTime®, RealVideo®, Shockwave® Flash®, or the like.

At 412, a thumbnail-selection utility selects a candidate thumbnail using a source or method of generating the thumbnails from the plurality of image frames that is characteristic of a particular user's behavioral preferences. In this implementation, the selection of candidate thumbnails is tailored to a particular user, and involves the determination of the optimum source for thumbnails for that particular user.

At 413, an appropriate target metric can be selected by retrieving the metric from memory. The selection could also be made randomly by a user or developer. Other alternative methods for selecting the appropriate target metric could include basing the selection on an analysis of the desired goals of the media disseminator. For example, if the primary goal is to maximize revenue generated by the media presentation represented by the thumbnail, then the target metric selected may be revenue generated. If the primary goal is to just ensure that the user watches the entire media presentation, then the selected target metric may be watch completions. A selection of Click Through Rates (CTRs) as the target metric may follow from a desire to increase a particular ranking based on the CTR.

At 414, a candidate-thumbnail-ranking calculator determines the score or ranking for the candidate thumbnail selected using a particular source for a particular user. For example, the candidate-thumbnail-ranking calculator may initially present the candidate thumbnail selected using a particular source for a particular user on a video sharing web site as representative of a video, and keep track of one or more of the Click Through Rate (CTR) for that candidate thumbnail, the Watch Completes for that candidate thumbnail, or the amount of revenue generated in conjunction with presentation of the video represented by the candidate thumbnail over a certain period of time after first presenting that candidate thumbnail to the user.

At 416, a candidate thumbnail score comparator determines the ratio between the ranking of the highest ranking or scoring candidate thumbnail selected by a particular source for a particular user, as calculated by the candidate-thumbnail-ranking calculator, and the aggregate sum of the scores for candidate thumbnails selected by all of the other sources for that particular user. As one example, if thumbnails with pictures of faces yields the highest success ranking for a particular user, the comparator will determine the ratio between the score for the thumbnail selected using the source of images with faces, and the scores for all thumbnails selected using other sources such as images with scenery, images with structures, etc.

At 418, a probabilistic learning module applies a learning process, such as represented by Equation A above, in order to calculate the probability of a particular source of thumbnails for a particular user being selected as the optimum source of thumbnails for that particular user for presentation as representative of a video or other media presentation. As discussed above, a global parameter, represented as the exponent in Equation A, can be varied to facilitate closing in on a global optimum value as quickly as possible. The exponent can be varied from values that are less than one early on in the thumbnail source selection process in order to avoid giving an initially high scoring thumbnail source too much weight before sufficient data has been gathered, to values greater than one as more data is gathered.

The result is that for exponents greater than one, the probability of selecting a high scoring source of thumbnails for a particular user as the optimum source for that user increases in a non-linear fashion, and as shown at 420, when the probability is high enough, the selected high scoring source of thumbnails for that user is considered the optimum source for that user, and the iterative process ends with presentation of a thumbnail selected using the optimum source for a particular user to that particular user at 428.

If the probability of selection of the highest ranking source of thumbnails for that user is not high enough at 420, a check is done at 422 to determine whether the score of the latest selected source of thumbnails has improved. If the score has improved, then at 424, the selection of different sources of candidate thumbnails for that particular user continues the same distance away and/or in the same direction as the preceding selection. If the score has not improved, then at 426, the probabilistic-learning utility can decide to jump to a random source of candidate thumbnails farther away and/or in a different direction from the previous selection. The process returns to 412 to select a candidate thumbnail using a new source characteristic of that user's behavioral preferences from the generated image frames.

Example Architecture

Implementations of the disclosure may include a method on a machine, a system or apparatus as part of or in relation to the machine, or a computer program product embodied in a computer readable medium executing on one or more of the machines. The one or more processors may be part of a server, client, network infrastructure, mobile computing platform, stationary computing platform, or other computing platform.

A processor may be any kind of computational or processing device capable of executing program instructions, codes, binary instructions and the like. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

Figure 5:
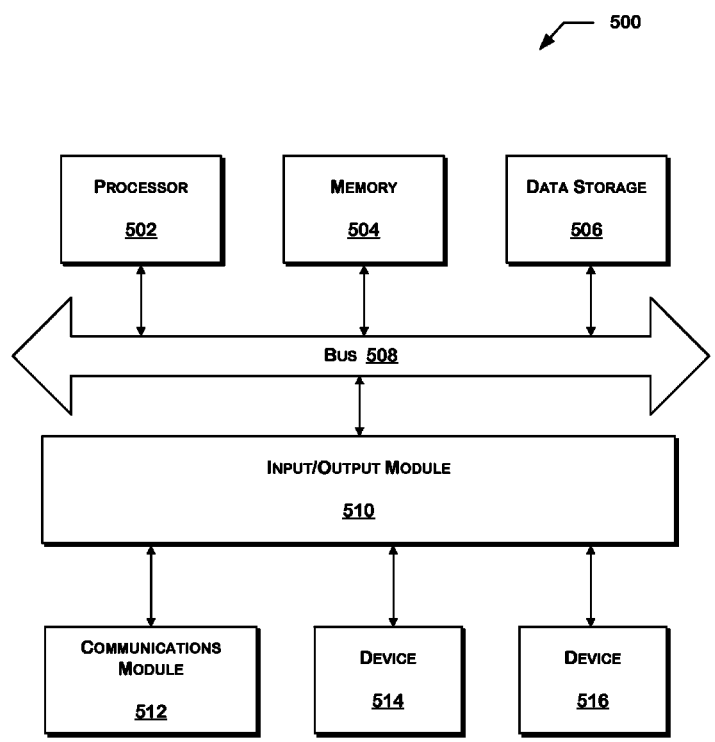
FIG. 5 is a schematic diagram of an exemplary computer system employed in accordance with one or more implementations of the disclosure.

FIG. 5 is a block diagram illustrating an exemplary computer system 500 with which the components of FIG. 1 and techniques of FIGS. 2, 3, and 4 can be implemented. In certain aspects, the computer system 500 may be implemented using hardware or a combination of software and hardware, either in a dedicated server, or integrated into another entity, or distributed across multiple entities.

Computer system 500 includes a bus 508 or other communication mechanism for communicating information, and a processor 502 coupled with bus 508 for processing information. By way of example, the computer system 500 may be implemented with one or more processors 502.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various techniques identified and described above may be varied, and that the order of techniques may be adapted to particular applications of the techniques disclosed herein. All such variations and modifications are intended to fall within the scope of this disclosure. As such, the depiction and/or description of an order for various techniques should not be understood to require a particular order of execution for those techniques, unless required by a particular application, or explicitly stated or otherwise clear from the context.

The methods and/or processes described above, and techniques thereof, may be realized in hardware, or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 include networking interface cards, such as Ethernet cards and modems. In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a CRT (cathode ray tube) or LCD (liquid crystal display) monitor, for displaying information to the user.

According to one aspect of the present disclosure, the thumbnail image selection system 100, as shown in FIG. 1, can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process as described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, an enterprise server or group of servers, one or more desktop computers, one or more laptop computers, etc. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable media" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments or implementations can also be implemented in combination in a single embodiment or implementation. Conversely, various features that are described in the context of a single embodiment or implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

In the claims appended herein, the inventor invokes 35 U.S.C. §112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. §112, paragraph 6.

What is claimed is:

1. A thumbnail image selection system comprising:
   a processor;
   an image-frame identifying utility operatively configured to identify a set of image frames from a media presentation comprising a plurality of image frames;
   a thumbnail-selection utility operatively configured to select thumbnail images from the set of image frames identified by the image-frame identifying utility as candidate thumbnails representative of the media presentation;
   a candidate-thumbnail-ranking calculator operatively configured to calculate a success ranking of each candidate thumbnail selected by the thumbnail-selection utility relative to a target metric, the target metric comprises rate information related to the media presentation;
   a probabilistic-learning utility operatively configured to determine an optimum candidate thumbnail in view of an indicator representing a relationship between the success ranking of a selected candidate thumbnail and the success rankings of other selected thumbnail images; and
   a candidate thumbnail presentation utility configured to provide data for displaying the optimum candidate thumbnail to a user as representative of the media presentation.

2. The system according to claim 1, further comprising:
   the probabilistic-learning utility further operatively configured to iteratively select successive candidate thumbnails in one or more of the same direction or the same distance away relative to the preceding selected candidate thumbnail as the preceding selected candidate thumbnail was selected from the candidate thumbnail immediately preceding it if the success ranking of a successive candidate thumbnail improves from the preceding candidate thumbnail.

3. The system according to claim 1, further comprising:
   the probabilistic-learning utility further operatively configured to iteratively select successive candidate thumbnails in one or more of a different direction or a different distance away relative to the preceding selected candidate thumbnail as the preceding selected candidate thumbnail was selected from the candidate thumbnail immediately preceding it if the success ranking of a successive candidate thumbnail does not improve from the preceding candidate thumbnail.

4. The system according to claim 1, further comprising:
   the probabilistic-learning utility further operatively configured to raise the success ranking of the candidate thumbnail with the highest success ranking to an exponent greater than one and raise the success rankings of all of the thumbnail images selected by the thumbnail-selection utility to the same exponent greater than one such that the probability of selecting the candidate thumbnail with the highest success ranking increases more rapidly in a non-linear fashion relative to the probability of selecting any of the other selected thumbnail images.

5. The system according to claim 1, further comprising:
   the probabilistic-learning utility further operatively configured to raise the success ranking of the candidate thumbnail with the highest success ranking to an exponent less than one early on in the selection process and raise the success rankings of all of the thumbnail images selected by the
   thumbnail-selection utility to the same exponent less than one such that the probability of selecting the candidate thumbnail with the highest success ranking increases more slowly in a non-linear fashion relative to the probability of selecting any of the other selected thumbnail images before a sufficiently representative number of thumbnail images have been selected by the thumbnail-selection utility.

6. The system according to claim 1, wherein:
   the image-frame identifying utility is further operatively configured to identify a set of one or more image frames from a media presentation located on a search result page, the one or more image frames containing one or more objects or visual information based, at least in part, on a topic of the search result page.

7. The system according to claim 1, wherein:
   the thumbnail-selection utility is further operatively configured to select one or more thumbnail images from the set of image frames identified by the image-frame identifying utility as one or more candidate thumbnails representative of the media presentation, wherein the selection is based, at least in part, on a behavioral preference of a user.

8. The system according to claim 7, wherein:
   the behavioral preference of the user is a type of image that is the most likely to cause that user to watch the media presentation.

9. The system according to claim 7, wherein:
   the behavioral preference of the user is one or more of an image of a face, an image of scenery or plants, an image of a structure, an image of an animal, an image depicting action, an image having bright colors, an image having sharp contrasts, or other visually distinguishable characteristics that are appealing to the user.

10. The system according to claim 1, wherein:
the thumbnail-selection utility is further operatively configured to select one or more thumbnail images using one or more of temporal image frame selection, random image frame selection, selection of image frames that are paused on the most, selecting image frames that are the most viewed, selecting image frames with the clearest view of faces, selecting image frames with one or more of the highest contrast, brightest colors or hues, selecting image frames with the least amount of difference in subject matter from surrounding image frames, selecting image frames with attributes specific to a desired category, or selecting image frames that are the most prominently displayed on a web page.

11. The system according to claim 1, wherein the rate information includes at least one of a click through rate, play to completion rate, play for a duration rate, revenue rate or count per session rate.

12. A computer implemented method comprising:
identifying, by a processing device, image frames from a media presentation comprising a plurality of image frames;
selecting candidate thumbnails from the identified image frames;
selecting a target metric against which to measure a success of a selected candidate thumbnail as representing the media presentation, the target metric comprising rate information related to the media presentation;
testing, by the processing device, each selected candidate thumbnail for a success ranking relative to the target metric;
determine a probability that a selected candidate thumbnail with a success ranking higher than other selected thumbnail images is an optimum candidate thumbnail in view of an indicator representing a relationship between the success ranking of the selected candidate thumbnail and the success rankings of the other selected thumbnail images; and
providing data for displaying the optimum candidate thumbnail to a user as representative of the media presentation.

13. The method according to claim 12, further comprising:
the determining a probability of choosing a selected candidate thumbnail as an optimum thumbnail for presentation to a user further comprising iteratively selecting successive candidate thumbnails in one or more of the same direction or the same distance away relative to the preceding selected candidate thumbnail as the preceding selected candidate thumbnail was selected from the candidate thumbnail immediately preceding it if the success ranking of a successive candidate thumbnail improves from the preceding candidate thumbnail.

14. The method according to claim 12, further comprising:
the determining a probability of choosing a selected candidate thumbnail as an optimum thumbnail for presentation to a user further comprising iteratively selecting successive candidate thumbnails in one or more of a different direction or a different distance away relative to the
preceding selected candidate thumbnail as the preceding selected candidate thumbnail was selected from the candidate thumbnail immediately preceding it if the success ranking of a successive candidate thumbnail does not improve from the preceding candidate thumbnail.

15. The method according to claim 12, further comprising:
the determining a probability of choosing a selected candidate thumbnail as an optimum thumbnail for presentation to a user further comprising raising the success ranking of the candidate thumbnail with the highest success ranking to an exponent greater than one and raising the success rankings of all of the selected thumbnail images to the same exponent greater than one such that the probability of selecting the candidate thumbnail with the highest success ranking increases more rapidly in a non-linear fashion relative to the probability of selecting any of the other selected thumbnail images.

16. The method according to claim 12, further comprising:
the determining a probability of choosing a selected candidate thumbnail as an optimum thumbnail for presentation to a user further comprising raising the success ranking of the candidate thumbnail with the highest success ranking to an exponent less than one early on in the selection process and raising the success rankings of all of the selected thumbnail images to the same exponent less than one such that the probability of selecting the candidate thumbnail with the highest success ranking increases more slowly in a non-linear fashion relative to the probability of selecting any of the other selected thumbnail images before a sufficiently representative number of thumbnail images have been selected.

17. The method according to claim 12, wherein:
the identifying image frames comprises identifying a set of one or more image frames from a media presentation located on a search result page, the one or more image frames containing one or more objects or visual information based, at least in part, on a topic of the search result page.

18. The method according to claim 12, wherein:
the selecting candidate thumbnails comprises selecting one or more thumbnail images from the identified image frames as one or more candidate thumbnails representative of the media presentation, wherein the selection is based, at least in part, on a behavioral preference of a user.

19. The method according to claim 18, wherein:
the behavioral preference of the user is a type of image that is the most likely to cause that user to watch the media presentation.

20. The method according to claim 18, wherein:
the behavioral preference of the user is one or more of an image of a face, an image of scenery or plants, an image of a structure, an image of an animal, an image depicting action, an image having bright colors, an image having sharp contrasts, or other visually distinguishable characteristics that are appealing to the user.

21. The method according to claim 12, wherein:
the selecting candidate thumbnails comprises selecting one or more thumbnail images using one or more of temporal image frame selection, random image frame selection, selection of image frames that are paused on the most, selecting image frames that are the most viewed, selecting image frames with the clearest view of faces, selecting image frames with one or more of the highest contrast, brightest colors or hues, selecting image frames with the least amount of difference in subject matter from surrounding image frames, selecting image frames with attributes specific to a desired category, or selecting image frames that are the most prominently displayed on a web page.

22. A non-transitory computer-readable media storing instructions that, when executed by a computing device, cause the computing device to perform operations comprising:

identifying image frames from a media presentation comprising a plurality of image frames;

selecting candidate thumbnails from the identified image frames; and testing each selected candidate thumbnail for a success ranking relative to a target metric, the target metric comprising rate information related to the media presentation;

determining a probability that a selected candidate thumbnail with a success ranking higher than other selected thumbnail images is an optimum candidate thumbnail in view of an indicator representing a relationship between the success ranking of the selected candidate thumbnail and the success rankings of the other selected thumbnail images; and providing data for displaying the optimum candidate thumbnail to a user as representative of the media presentation.

23. The non-transitory computer-readable media according to claim 22, the operations further comprising:

the determining a probability of choosing a selected candidate thumbnail as an optimum thumbnail for presentation to a user further comprising iteratively selecting successive candidate thumbnails in one or more of the same direction or the same distance away relative to the preceding selected candidate thumbnail as the preceding selected candidate thumbnail was selected from the candidate thumbnail immediately preceding it if the success ranking of a successive candidate thumbnail improves from the preceding candidate thumbnail.

24. The non-transitory computer-readable media according to claim 22, the operations further comprising:

the determining a probability of choosing a selected candidate thumbnail as an optimum thumbnail for presentation to a user further comprising iteratively selecting successive candidate thumbnails in one or more of a different direction or a different distance away relative to the preceding selected candidate thumbnail as the preceding selected candidate thumbnail was selected from the candidate thumbnail immediately preceding it if the success ranking of a successive candidate thumbnail does not improve from the preceding candidate thumbnail.

25. The non-transitory computer-readable media according to claim 22, the operations further comprising:

the determining a probability of choosing a selected candidate thumbnail as an optimum thumbnail for presentation to a user further comprising raising the success ranking of the candidate thumbnail with the highest success ranking to an exponent greater than one and raising the success rankings of all of the selected thumbnail images to the same exponent greater than one such that the probability of selecting the candidate thumbnail with the highest success ranking increases more rapidly in a non-linear fashion relative to the probability of selecting any of the other selected thumbnail images.

26. The non-transitory computer-readable media according to claim 22, the operations further comprising:

the determining a probability of choosing a selected candidate thumbnail as an optimum thumbnail for presentation to a user further comprising raising the success ranking of the candidate thumbnail with the highest success ranking to an exponent less than one early on in the selection process and raising the success rankings of all of the selected thumbnail images to the same exponent less than one such that the probability of selecting the candidate thumbnail with the highest success ranking increases more slowly in a non-linear fashion relative to the probability of selecting any of the other selected thumbnail images before a sufficiently representative number of thumbnail images have been selected.

27. The non-transitory computer-readable media according to claim 22, the operations further comprising:

the identifying image frames comprises identifying a set of one or more image frames from a media presentation located on a search result page, the one or more image frames containing one or more objects or visual information based, at least in part, on a topic of the search result page.

28. The non-transitory computer-readable media according to claim 22, the operations further comprising:

the selecting candidate thumbnails comprises selecting one or more thumbnail images from the identified image frames as one or more candidate thumbnails representative of the media presentation, wherein the selection is based, at least in part, on a behavioral preference of a user.

* * * * *